Figure 1:
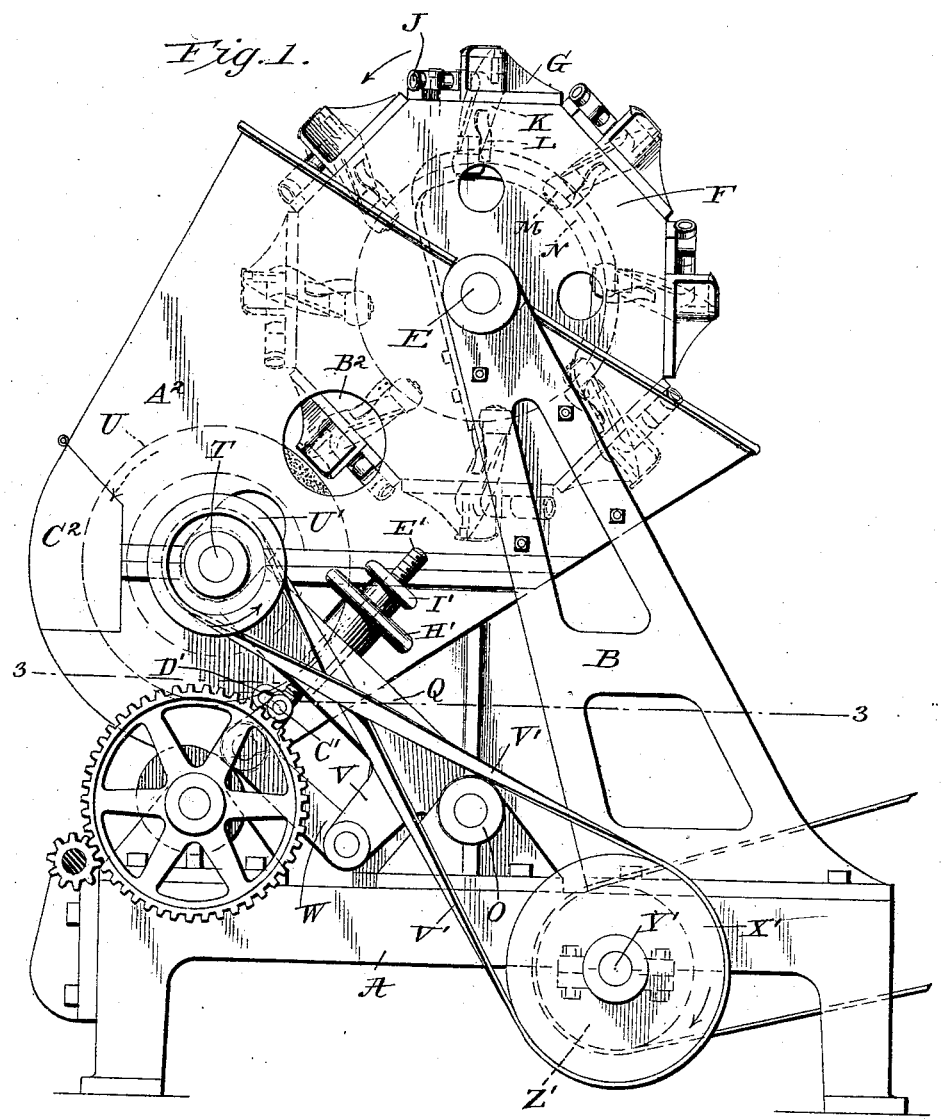

H. ROBINSON.
GRINDING MACHINE.
APPLICATION FILED SEPT. 4, 1907.

908,141.

Patented Dec. 29, 1908.
5 SHEETS—SHEET 1.

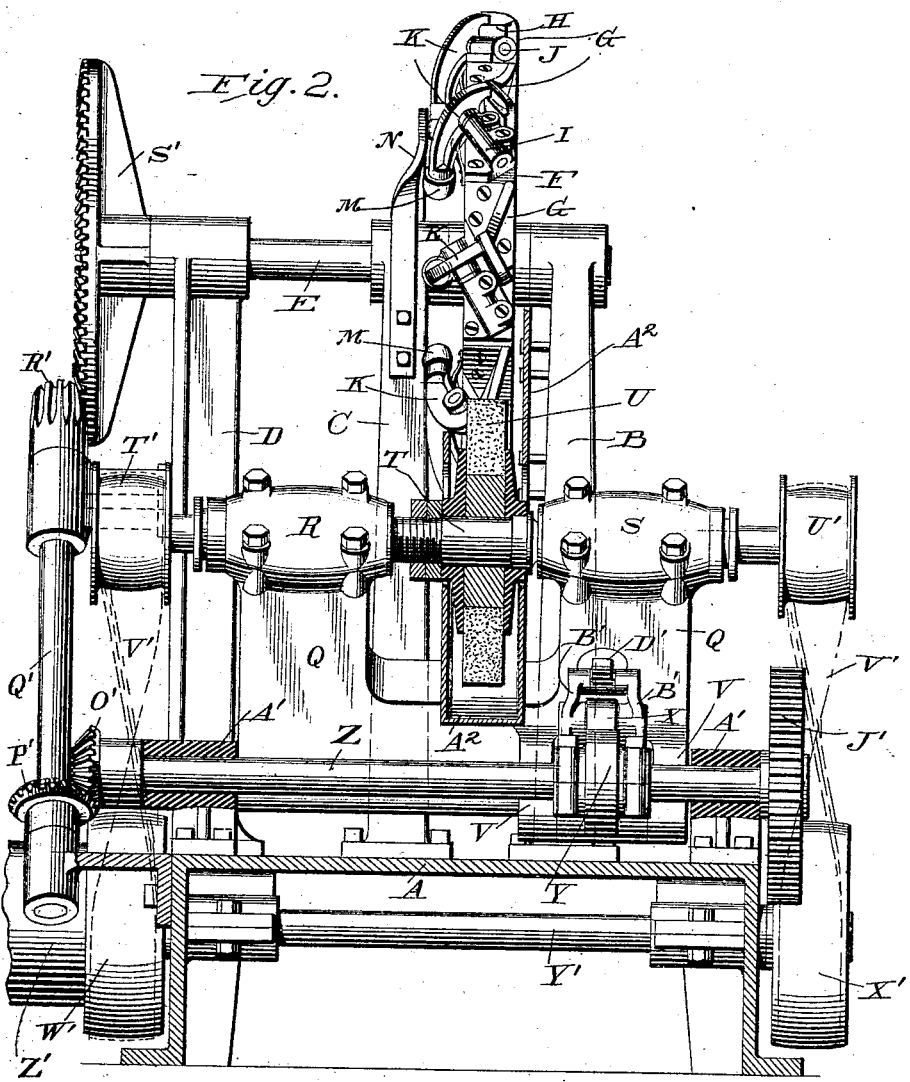

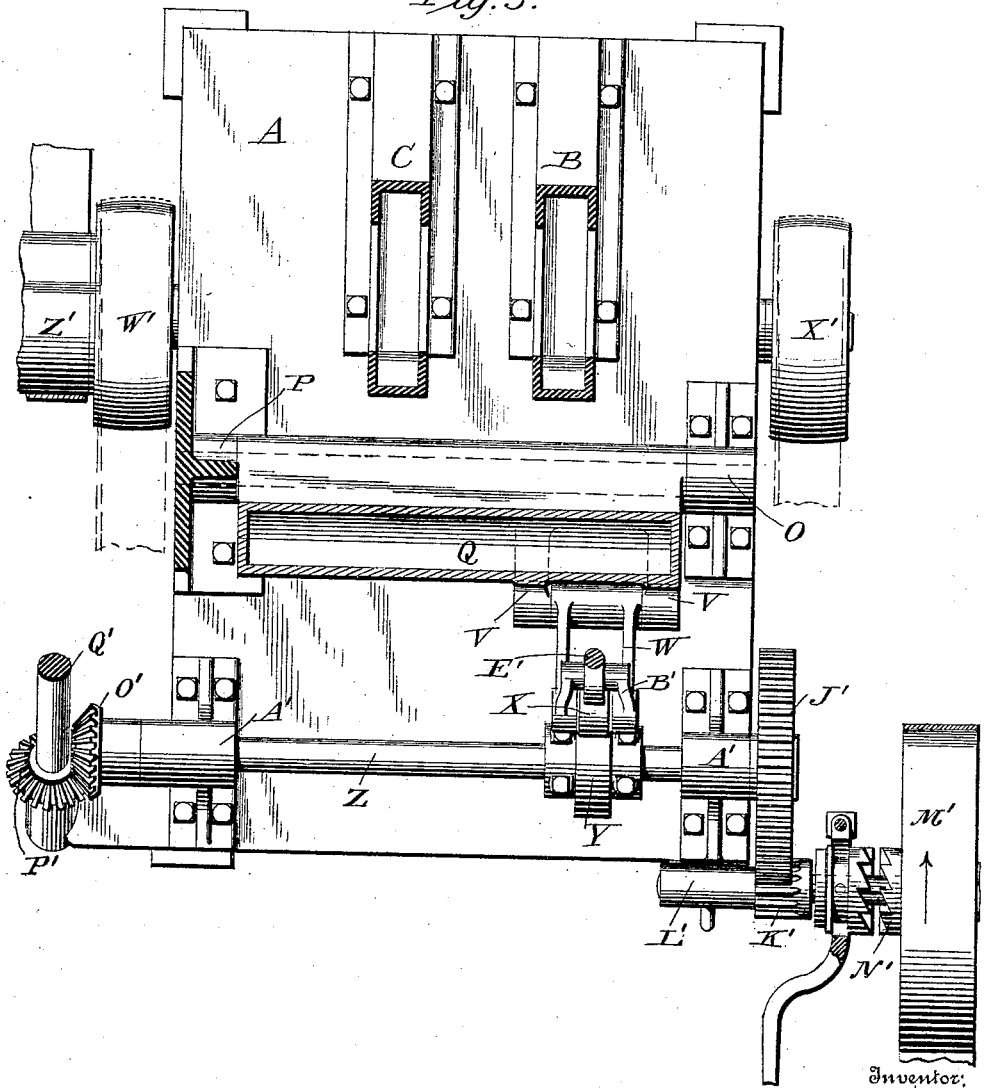

H. ROBINSON.
GRINDING MACHINE.
APPLICATION FILED SEPT. 4, 1907.
908,141.
Patented Dec. 29, 1908.
5 SHEETS—SHEET 4.
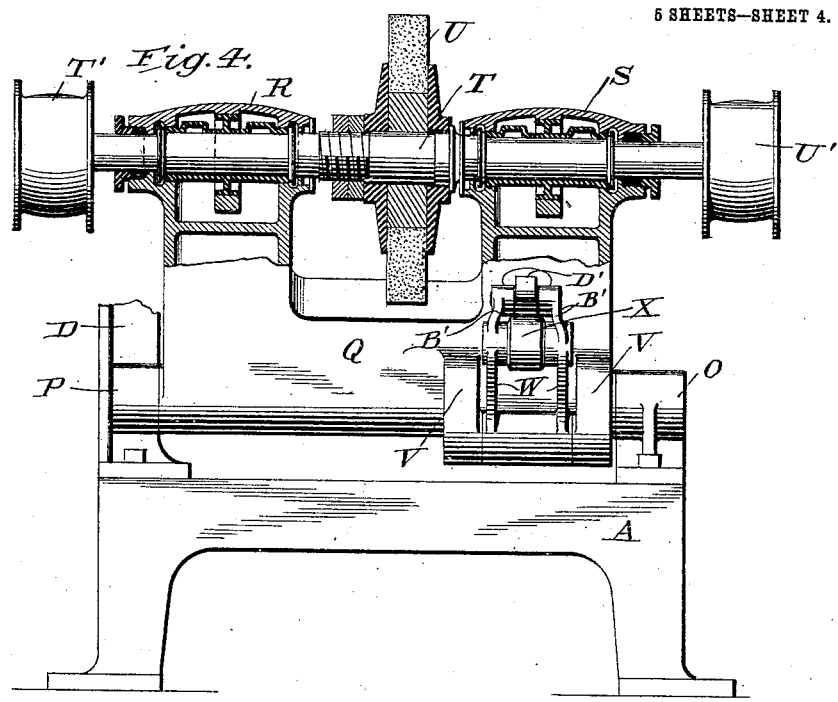
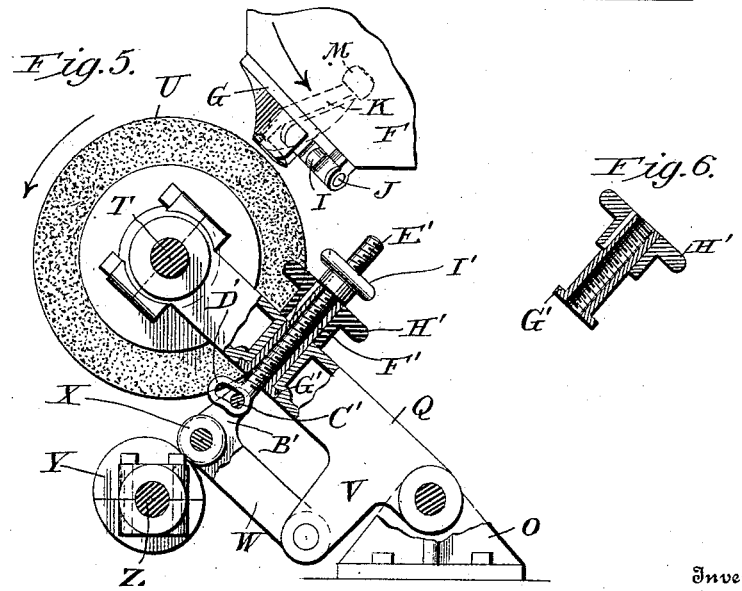
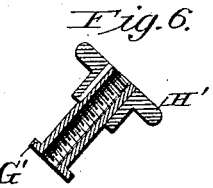

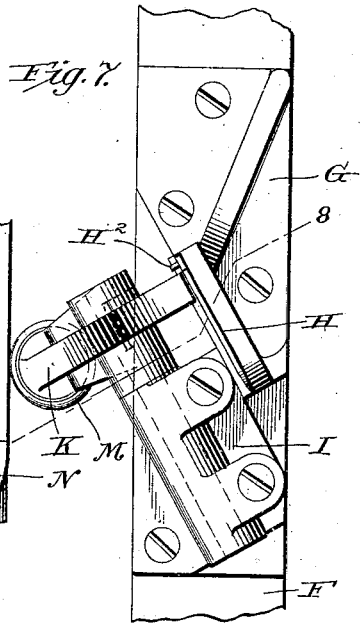
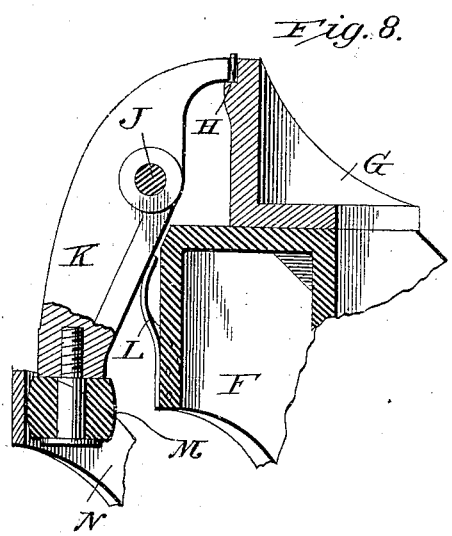
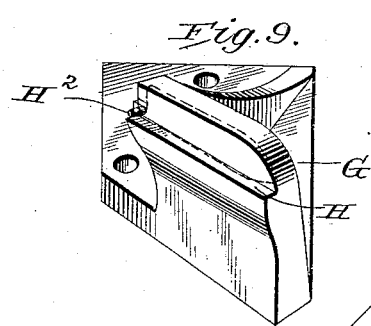
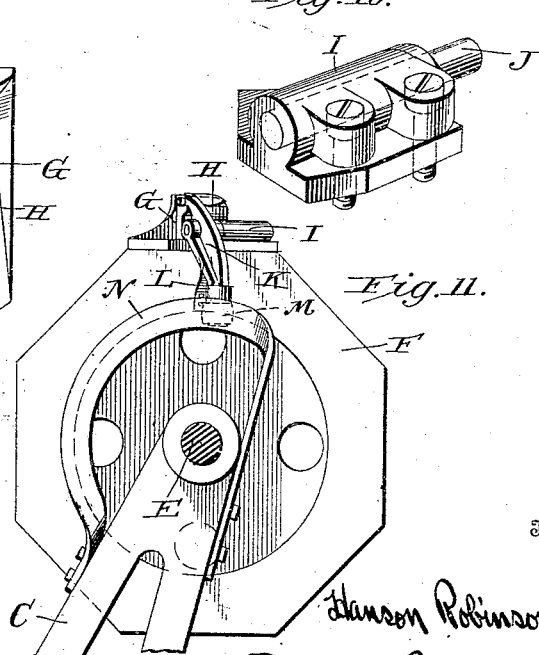

UNITED STATES PATENT OFFICE.

HANSON ROBINSON, OF HANOVER, PENNSYLVANIA, ASSIGNOR TO THE MILLER BROTHERS CUTLERY COMPANY, OF MERIDEN, CONNECTICUT, A CORPORATION OF CONNECTICUT.

GRINDING-MACHINE.

No. 908,141.          Specification of Letters Patent.          Patented Dec. 29, 1908.

Application filed September 4, 1907. Serial No. 391,285.

*To all whom it may concern:*

Be it known that I, HANSON ROBINSON, a citizen of the United States, residing at Hanover, in the county of York and State of Pennsylvania, have invented certain new and useful Improvements in Grinding-Machines, of which the following is a specification.

My present invention relates to improvements in grinding machines, and pertains more particularly to machines for grinding the backs of knife-blades.

The machine is illustrated in the accompanying drawings, wherein:

Figure 1 is a side elevation thereof; Fig. 2 a front elevation, parts being shown in section to more clearly illustrate the construction; Fig. 3 a horizontal sectional view, taken on the line 3—3 of Fig. 1; Fig. 4 a detail sectional elevation of the grinder-carrying frame; Fig. 5 an end elevation of the grinder-frame and a portion of the blade-carrier, with parts of the frame in section; Fig. 6 a detailed sectional view of the adjusting sleeve; Fig. 7 a top plan view of one of the blade-holders; Fig. 8 a sectional view on the line 8—8 of Fig. 7; Fig. 9 a perspective view of one portion of the knife-holder or clamp; Fig. 10 a similar view of another portion of the clamp; and Fig. 11 a side elevation of the blade-carrier and the cam employed to release the clamp.

The object of the present invention is to provide a machine which will automatically grind the back of a blade to the desired form, it being necessary only for the attendant to place the blades to be ground into the clamps as they are successively brought to position in front of the operator.

In the drawings, A denotes the bed of the machine, to one end of which are secured two frames or uprights B and C which, together with a third upright D, located at one side of the bed, form the support for a horizontally-disposed shaft E. Secured upon the shaft, intermediate the uprights B and C, is a frame or carrier F, preferably provided with a series of flat faces upon its edge for the reception of the knife-holding and clamping members, which are secured thereon. Said members are formed as shown in detail in Figs. 7 to 10 inclusive, and comprise in part a casting or block G having a shelf or ledge H formed at its outer edge for the reception of the knife-blade, the ledge or shelf being disposed at an angle to the axis of the carrier. A pin $H^2$ extends outwardly from the block or casting G, and passes through the hinge hole of the blade when the blade is in position. A second block or casting I is secured to the carrier F adjacent to the first casting, said block, having secured thereto a shaft or axle J upon the outer end of which is pivoted a clamping lever K, the upper reduced end of which is adapted to bear against the shank or root end of the blade when the same is in position on the shelf. A spring L serves to throw the inner end of the lever outward so that normally the reduced end will make contact with the blade. The inner clamp at the end of the lever may, of course, have an extended bearing if found desirable. A bowl M mounted on the inner end of the lever, coacts with a cam-track N secured to the frame C and serves to throw the inner end of the lever inwardly as the clamps are brought forwardly in succession by the rotation of the carrier. Thus the ground blades will be released and the clamps retained in their open position for a short space of time while a new blade is being introduced.

Pivotally mounted on a shaft having its ends seated respectively in a bearing or box O and a box or bearing P formed in the upright D is a swinging, yoke-shaped grinder wheel carrying frame Q. Suitable journal-bearings R and S, preferably waterproof and with oil-tight reservoirs, are provided at the upper ends of the frame and a shaft T is mounted therein, the shaft carrying a grinding-wheel U which stands in alinement with the knife-carrier. Frame Q is provided with a pair of downwardly-projecting lugs or arms V and an arm W is fulcrumed upon a shaft sustained in the outer ends of the lugs. Arm W is bifurcated at its outer end and a roll X is carried thereby, said roll coacting with a cam Y mounted upon a shaft Z which has its bearings in boxes A' secured to the bed. Arm W is also provided with two upwardly-extending ears B' and a cross-pin C' is carried thereby. Said pin passes through an elongated slot formed in a head D' carried at the lower end of a threaded stem or rod E'. Said stem passes through an internally-threaded sleeve F' which is mounted in an opening formed in the swinging grinder wheel-frame Q, the sleeve being provided with a flange or collar G' at its lower end which prevents the upward movement of the sleeve through the opening in the frame. A hand-piece H′ is keyed to the upper end of the sleeve, whereby said sleeve may be rotated and endwise movement of the same in a downward direction be prevented. A lock-nut I′ is mounted upon the outer end of the stem and serves to lock the parts in their adjusted position. As will be readily appreciated, adjustment of the stem in or out will throw the frame Q and as a consequence the grinder U toward or from the carrier or frame F, and by thus adjusting the parts the grinder may be brought to any desired position, such adjustment being necessary for different sized blades.

Shaft Z carries at one end a gear J′, which meshes with a pinion K′ carried by a shaft L′ to which motion is imparted through a driving pulley M′ when the clutch N′ is drawn into operative relation therewith. The opposite end of the shaft Z is provided with a miter-gear O′ which meshes with a similar gear P′ mounted upon a shaft Q′ that extends upwardly in an inclined direction and carries at its upper end a pinion R′ which meshes with a large gear S′ carried upon one end of the shaft E. Motion is thus imparted to the cam Y and to the carrier F from the driving pulley M′. Shaft T is provided upon its ends with band-pulleys T′ and U′, belts V′ passing around said pulleys and around pulleys W′ and X′ (Figs. 2 and 3) which are carried upon a shaft Y′ driven by a band-wheel Z′.

In order to protect the apparatus and likewise to shield the operator, the grinder-wheel and the lower portion of the carrier F are inclosed within a casing $A^2$ which for the sake of convenience is provided with a sight-opening $B^2$ adjacent to the grinding-point. The casing may also be provided with a door $C^2$ through which the grinding-stone may be inspected from time to time and water introduced, if its presence should be necessary.

The operation of the machine is as follows: The operator places a blank or knife-blade upon the shelf or ledge H of the clamp and as the carrier rotates in the direction of the arrow, Fig. 1, and the bowl M passes off of the cam-track N, the lever K will be rocked by the spring L and the blank clamped by the upper reduced end of the lever. The blade, as will be seen upon reference to Figs. 2 and 7, will be disposed at an angle to the axis of the carrier, and as a consequence at an angle to the face of the grinder. The cam Y is so shaped and timed that the frame Q will be thrown up toward the knife-blade so that the grinder carried thereby will come into contact with the end of the blade adjacent to the point, the cam receding and the frame Q dropping away from the carrier as the latter is rotated, so that the grinder will follow the curve which it is desired to impart to the back of the knife. As will be readily appreciated, by changing the cam, knives having backs of any desired form may be ground, the frame Q being raised and lowered as required. The blades in the different clamps are successively presented to the grinding-wheel and as the carrier moves forward the bowl M of each clamp will come into contact with the forward portion of the cam-track and the finished blank will be released and drop from the holder into a suitable receptacle or onto a conveyer and thus be taken away from the machine.

It is conceivable that in so far as the arrangement and construction of the machine are concerned it may be varied in details without departing from the spirit of the invention. The driving mechanisms, for instance, may be changed and other forms of clamps for the knives be employed. Likewise, the carrier may be moved toward and from the grinder, the bearings for the latter being fixed. The construction shown is, however, preferred for obvious reasons.

Having thus described my invention, what I claim is:

1. In a machine for grinding knife-blades, the combination of a rotatable carrier; means carried thereby for holding a knife-blade with the back thereof projecting outwardly; a grinding-wheel; and means for moving the wheel toward and from the carrier in a predetermined path and against the back of the blade, whereby the back will be ground to the desired form.

2. In a machine for grinding knife-blades, the combination of means for supporting a blade with the back thereof exposed; a grinder having its axis disposed at an angle to the back of the blade; and means for moving the grinder in a predetermined path against the back of the blade to give the desired form thereto.

3. In a machine for grinding knife-blades, the combination of a rotatable carrier; means for holding a knife-blade with its back at an angle to the axis of said carrier; a grinder having its axis in substantial parallelism with that of the carrier; and means for moving the grinder in a predetermined path along the back of the blade.

4. In a machine for grinding knife-blades, the combination of a rotatable carrier; a series of clamps mounted thereon and each arranged to hold a knife-blade with its back at an angle to the axis of the carrier; a grinder; and means for moving the grinder successively in a predetermined path into and out of contact with the backs of the blades.

5. In a machine for grinding knife-blades, the combination of a carrier; a series of clamps mounted thereon, each clamp being designed to hold a knife-blade at an angle to the axis of the carrier; a pivoted frame; a grinder carried at the free end of said frame; and a pattern cam arranged to move the frame and the grinder toward and from the blades held by the clamps.

6. In a machine for grinding knife-blades, the combination of a carrier; a series of clamps mounted thereon, each clamp being adapted to hold a blade at an angle to the axis of the carrier; a swinging frame; a grinder carried at the free end of the frame; a pattern cam; and adjustable means interposed between the cam and the frame for varying the initial position of the grinder with reference to the blades carried by the clamps.

7. In a machine for grinding knife-blades, the combination of a rotatable carrier; a series of clamps mounted thereon, each of said clamps being adapted to hold a blade at an angle to the axis of the carrier; a swinging frame; a grinder carried at the outer end of said frame, the axis of the grinder being in substantial parallelism with that of the carrier; a pattern cam; an arm pivoted to the frame; a roll carried by the arm and bearing upon the cam; and means for adjusting said arm with reference to the frame, whereby the initial position of the frame may be varied.

8. In a machine for grinding knife-blades, the combination of a carrier; a series of clamps mounted thereon, each of said clamps being adapted to support a knife-blade at an angle to the axis of the carrier; a swinging frame; a grinder carried at the free end of said frame, the axis of the grinder being in substantial parallelism with that of the carrier; an arm fulcrumed upon the frame; a roll carried at the outer end of the arm; a pattern cam coacting with said roll; a threaded stem connected to the outer end of the arm; a threaded sleeve mounted in the frame and coacting with the threaded stem; and means for securing the sleeve and the stem in their adjusted positions.

9. In a machine for grinding knife-blades, the combination of a rotatable carrier; a series of knife-clamps mounted thereon; a grinder; a pattern cam for moving the grinder successively toward and from each of said clamps; means for rotating the carrier while the grinder is acting and means for opening the clamps and releasing the blades after they have been acted upon by the grinder.

10. In a machine for grinding knife-blades the combination of a rotatable carrier; a series of knife-clamps mounted thereon; a grinder; means for successively moving the grinder into contact with the backs of the blades carried by the clamps; and means for constantly rotating the carrier.

11. In a machine for grinding knife-blades, the combination of a carrier; a series of knife-clamps mounted thereon, each of said clamps comprising a fixed block provided with a ledge or shelf, and a swinging arm or lever adapted to be forced against the blade mounted upon the ledge; a grinder; and means for successively moving the grinder into contact with the backs of the blades carried by the clamps.

12. In a machine for grinding knife-blades, the combination of a rotatable carrier; a series of knife-clamps mounted thereon, each of said clamps comprising a fixed block provided with a ledge or shelf disposed at an angle to the axis of the carrier; a lever fulcrumed adjacent to the block and having its upper or outer end normally pressed inward toward the fixed block; a grinder; means for successively moving the grinder into contact with the backs of the blades carried by the clamps; and means for acting upon the inner end of the lever of each clamp to withdraw the same from contact with the blade after the blade has been acted upon by the grinder.

13. In combination with a carrier adapted to support a knife-blade; a grinder arranged to act on the back of the blade; and means for securing a relative movement of the parts toward and from each other, the movement being substantially that of the desired shape which is to be imparted to the back of the blade.

14. In combination with a carrier adapted to support a knife-blade; a grinder; and a pattern cam acting to cause a relative movement of the parts toward and from each other, the cam being patterned or fashioned to conform to the shape of the back which it is desired to form on the blade.

In testimony whereof I have signed my name to this specification in the presence of two subscribing witnesses.

HANSON ROBINSON.

Witnesses:
EDWARD M. WINTERS,
C. R. WISTER.